United States Patent [19]

Fuke et al.

[11] Patent Number: 5,128,952

[45] Date of Patent: Jul. 7, 1992

[54] METAL ION LASER

[75] Inventors: Akira Fuke; Yasuhiro Tokita; Mitsuo Tsukiji; Yoshihiro Uchiyama, all of Shimizu, Japan

[73] Assignee: Koito Manufacturing Co., Ltd., Tokyo, Japan

[21] Appl. No.: 584,068

[22] Filed: Sep. 18, 1990

[30] Foreign Application Priority Data

Apr. 12, 1990 [JP] Japan .................... 2-96994

[51] Int. Cl.⁵ .................... H01S 3/22
[52] U.S. Cl. .................... 372/56; 372/65; 372/87; 372/88; 372/103
[58] Field of Search .................... 372/65, 33, 103, 88, 372/87, 56

[56] References Cited

U.S. PATENT DOCUMENTS

| | | | |
|---|---|---|---|
| 3,988,698 | 10/1976 | Crane et al. | 372/65 |
| 4,081,762 | 3/1978 | Golser et al. | 372/65 |
| 4,277,761 | 7/1981 | Silva et al. | 372/33 |
| 4,553,240 | 11/1985 | Schmid | 372/65 |
| 4,701,925 | 10/1987 | Fuke et al. | 372/38 |
| 4,710,938 | 12/1987 | Fuke et al. | 372/56 |
| 4,794,612 | 12/1988 | Fuke | 372/56 |
| 4,821,280 | 4/1989 | Kawase | 372/33 |
| 4,916,713 | 4/1990 | Gerber | 372/65 |
| 4,947,403 | 8/1990 | Ishihara et al. | 372/65 |

Primary Examiner—Georgia Y. Epps
Attorney, Agent, or Firm—Koda and Androlia

[57] ABSTRACT

A hollow cathode type metal ion laser utilizing negative glow discharge for generating a laser beam. A hollow cathode is inserted into a glass tube, and there are provided springs between opposite ends of the hollow cathode and adjacent ends of the glass tube respectively.

4 Claims, 10 Drawing Sheets

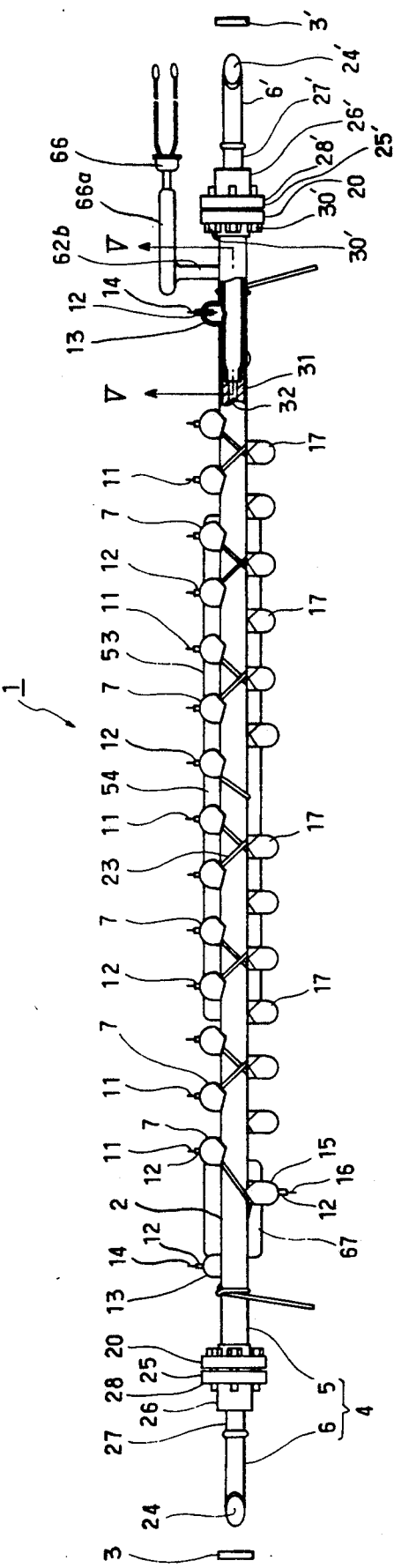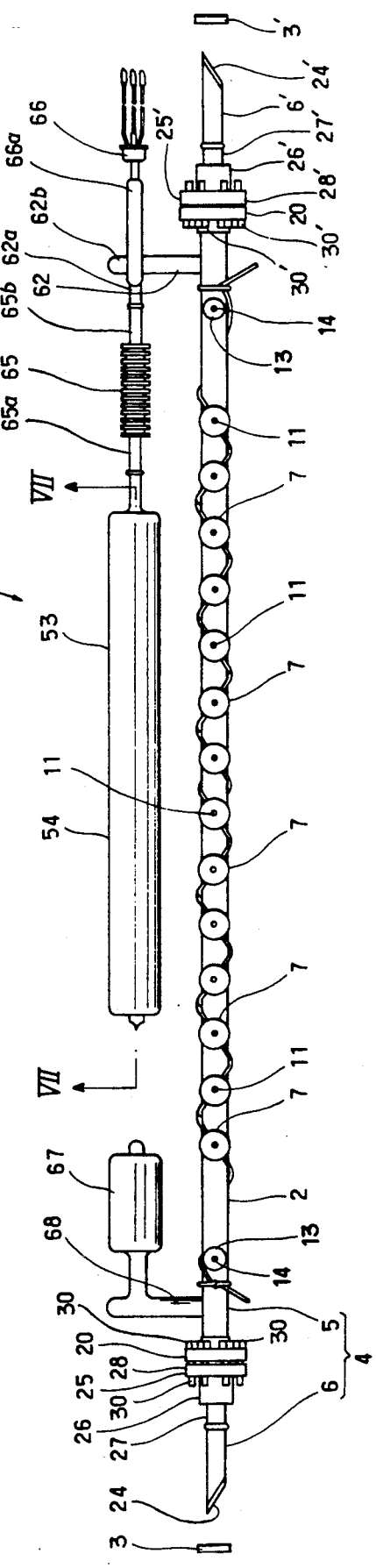

METAL ION LASER

FIELD OF THE INVENTION

The present invention relates to a metal ion laser and, particularly to a hollow cathode type metal ion laser.

DESCRIPTION OF PRIOR ART

Various proposals have been made with respect to the hollow cathode type metal ion laser utilizing negative glow discharge for generating a laser beam. In the laser of the aforementioned type, a hollow cathode is inserted into a substantially tubular glass tube having an anode and the like thereon, with the hollow cathode being connected to a cathode pin which is retained on the glass tube, and an opening being formed in the hollow cathode at the location corresponding to the anode and the like.

In such prior art hollow cathode type metal ion laser, there is a problem that when the hollow cathode is not positioned precisely with respect to the tube, the relative positional relationship between the hollow cathode and the anode and the like being mounted on the glass tube cannot be maintained thereby impeding the normal laser oscillation. The hollow cathode may fixedly be mounted on the glass tube for solving the above mentioned problem. However, the coefficients of thermal expansion of the glass tube and the hollow cathode differ substantially, the difference between the amounts of thermal expansion due to the high temperature in the operating condition of the laser applies on the glass tube a high internal stress, which induces a crack or breakage of the glass tube.

Further, when a large axial force acts on the hollow cathode during handling or transporting the laser device, the glass tube may also be damaged.

An object of the invention is to provide a novel hollow cathode type metal ion laser solving the problems above described.

SUMMARY OF THE INVENTION

According to the invention, there is provided a hollow cathode type metal ion laser utilizing negative glow discharge for generating a laser beam, wherein a hollow cathode is inserted into a glass tube, and spring means is disposed between at least one end of the hollow cathode and the glass tube.

Preferably, a cathode pin passing through and retained on a side wall of the glass tube and the hollow cathode are connected through a connector piece which is formed of a flexible electroconductive material.

According to the invention, the hollow cathode is not fixedly retained on the glass tube, the difference between the amount of thermal expansion therebetween is absorbed by the relative displacement of the hollow cathode and the glass tube, thus, any excessive stress do not act on the glass tube and the breakage thereof is prevented. Further, by providing the spring means on opposite ends of the hollow cathode, the relative thermal expansion of the hollow cathode with respect to the glass tube is divided equally on opposite ends, and the relative positional relationship between the hollow cathode and anode and the like being fixedly mounted on the glass tube can be maintained. Further, the shock and the like which may be applied on the hollow cathode during transportation can be absorbed by the spring means, thus the breakage of the glass tube can also be prevented.

BRIEF DESCRIPTION OF THE DRAWINGS

Further objects and effects of the invention will become apparent from the following detailed description in conjunction with the drawings, in which:

FIG. 1 is a partially broken side view of a hollow cathode type metal ion laser according to a preferred embodiment of the present invention;

FIG. 2 is a plan view of the laser of FIG. 1;

DETAILED DESCRIPTION OF PREFERRED EMBODIMENTS

Figure 3:
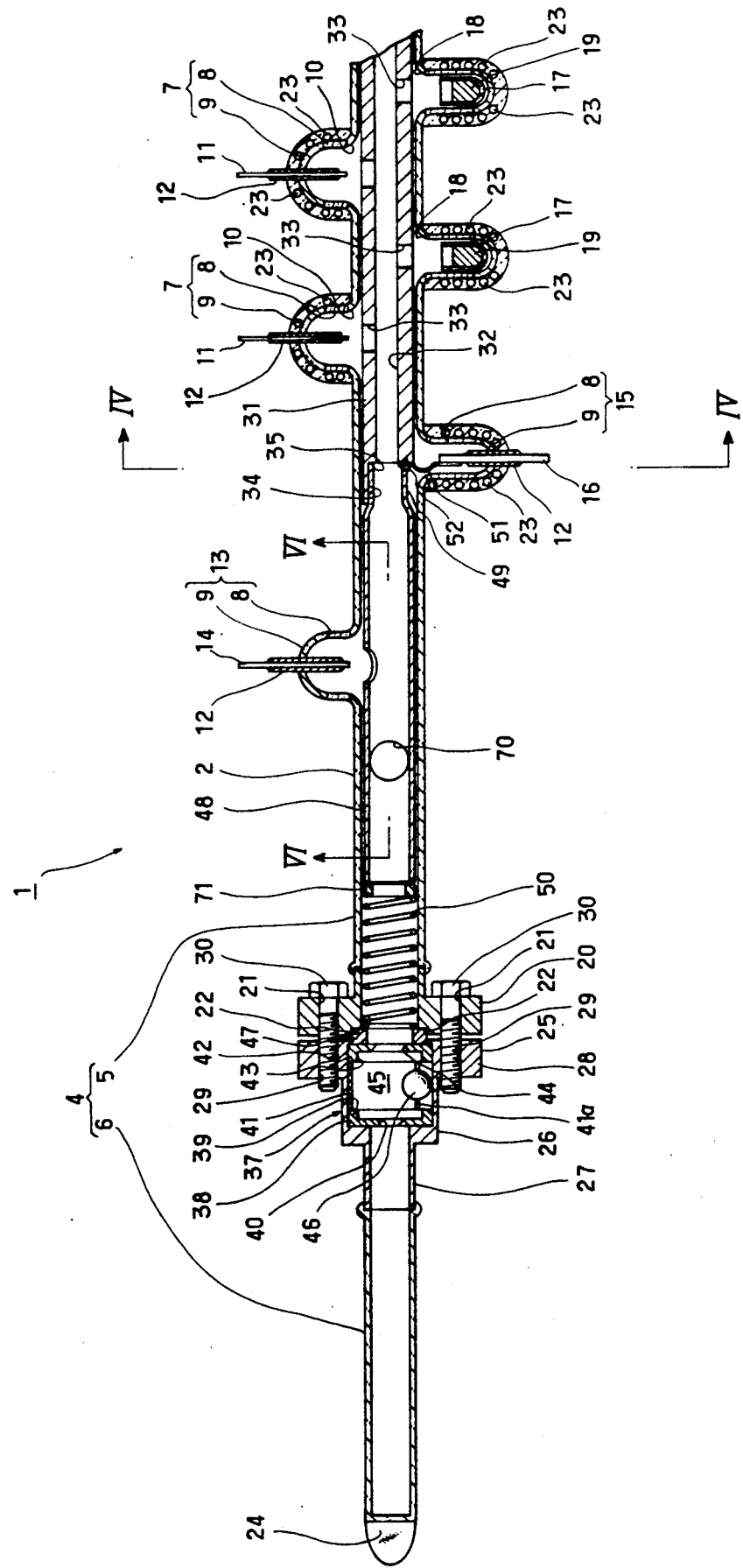
FIG. 3 is an enlarged sectional view taken generally along line III—III of FIG. 2.

Shown at numeral 1 in the drawings is a He-Cd ion laser as being a preferred embodiment of a hollow cathode type metal ion laser according to the invention.

The laser 1 comprises a laser tube 2 and oscillating means (reflective mirrors) 3 and 3' disposed on opposite ends of the laser tube 2. There are provided supporting means, a casing and the like for supporting the laser tube and the oscillating means, but are not shown in the drawings.

The laser tube 2 consists of a glass main tube 4, a hollow cathode 31, a plurality of anodes 11, 11 . . . and the like.

GLASS MAIN TUBE

The glass main tube 4 comprises a circular elongated central tube portion 5 extending generally in fore and aft directions or in left and right directions as viewed in FIG. 1, and circular elongated end tube portions 6 and 6' connected respectively to the front and rear ends of the central tube portion 5.

CENTRAL TUBE PORTION

The central tube portion 5 is formed of a glass and is provided thereon anodes 11, 11 . . . , a cathode pin 16, metal chambers 17, 17 . . . and the like.

ANODE

A plurality of anode mounts 7, 7 . . . are provided on the central tube portion 5 at nearly equal space along the length except for portions near to opposite ends. Each anode mount 7 consists integrally of a short tubular intermediate portion 8 and a dome shaped closure portion 9 formed respectively of glass, with one end of the intermediate portion 8 being fused to edge portion of each of openings 10, 10 . . . in the central tube portion 5. The other end of the intermediate portion 8 is fused to edge portion of the closure portion 9.

The anodes 11, 11 . . . are mounted respectively on the anode mounts 7, 7 . . . and are made of tungsten into a pin-like shape. Each anode 11 is passing through and mounted on the central portion of the closure member 9 through tungsten closure glass 12.

The anodes 11, 11 . . . are connected to an electric power supply circuit of a control circuit not shown.

Auxiliary anode mounts 13 and 13 are provided aligning with the anode mounts 7, 7 . . . at locations near to the opposite ends. The auxiliary anode mounts 13 and 13 are also formed of intermediate portions 8 and 8 and closure portions 9 and 9. Auxiliary anodes 14 and 14 made of tungsten into pin-like shape are passing through and mounted on the central portions of the closure members 9 through tungsten closure glass 12 respectively.

CATHODE PIN

A cathode pin mount 15 is mounted on the central tube portion 5 at the side opposite to the anodes 11, 11 . . . and the auxiliary anode mounts 13 and 13, and between one of the auxiliary anode mounts 13 and adjacent anode 11 as shown in FIG. 1. The cathode pin mount 15 comprises a generally tubular intermediate portion 8 with one end of which being welded to the peripheral edge of an opening formed in the central tube portion 5, and a dome-shaped closure portion 9 being integrally fused to the other end of the intermediate portion 8. A cathode pin 16 preferably made of tungsten is passing through and fixedly mounted on the central portion of the closure member 9 interposing therebetween tungsten closure glass 12.

METAL CHAMBER

The metal chambers 17, 17 . . . contain therein Cd metal 19, 19 . . . to be vaporized for producing Cd ion. Each metal chamber 17 is formed of a short glass tube with one end of which being closed and the other end being welded to peripheral edge of an opening 18 in the central tube portion 5. The metal chambers 17, 17 . . . are located on the side opposite to the anodes 11, 11 . . . and auxiliary anodes 14 and 14, and at the pitch nearly equal to that of the anodes 11, 11 . . . and being displaced by half pitch. In the drawing the metal chamber is not provided on the lengthwise central position, but may be provided also on the central position.

CONNECTING FLANGE

Shown at numerals 20 and 20 are connecting flanges made of a non-magnetic metal such as stainless steel and fused to front and rear ends of the central tube portion 5 and through one or more intermediate glass layers (not shown) for adjusting the difference in the coefficient of thermal expansion.

Figure 9:
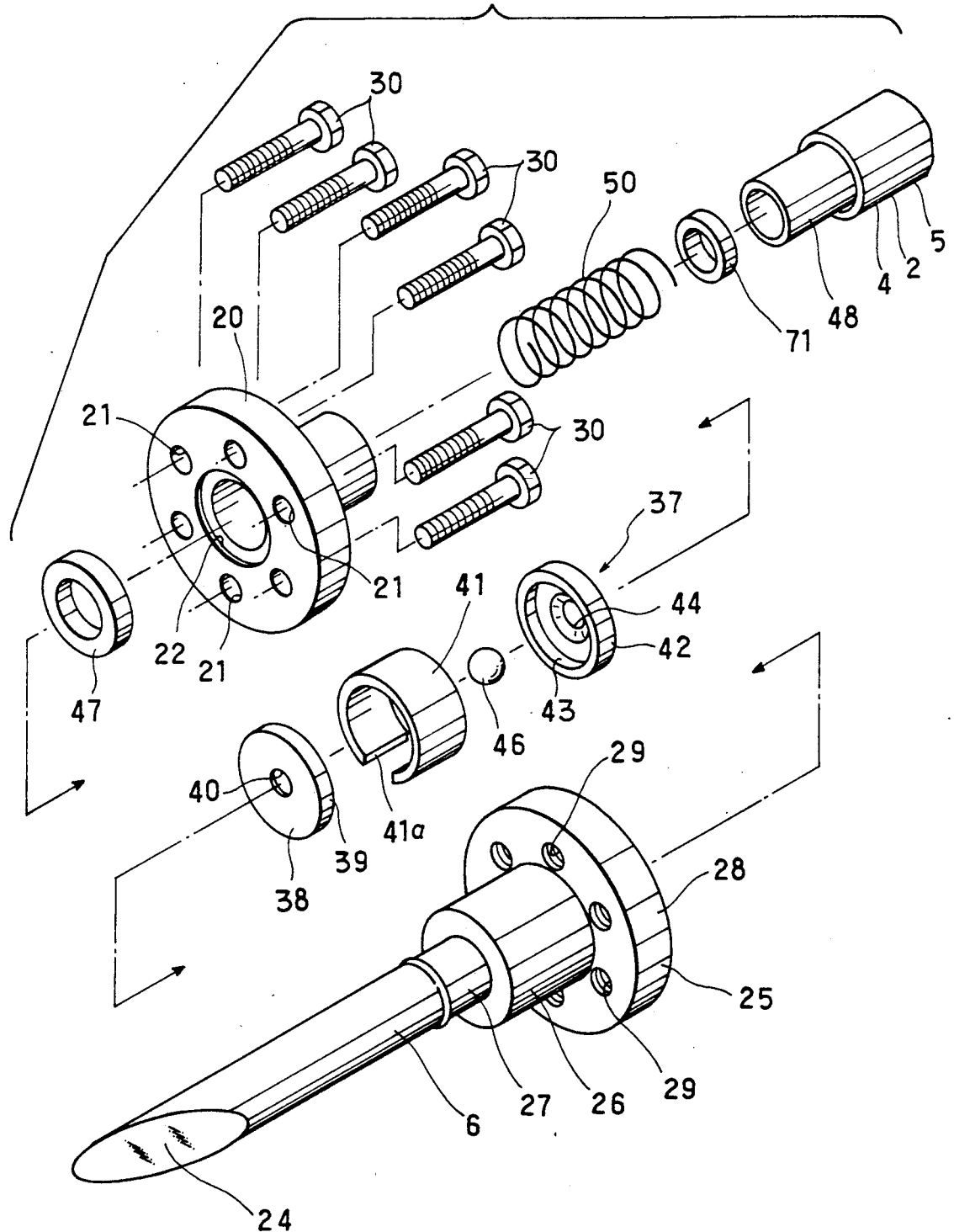
FIG. 9 is an enlarged exploded perspective view of a Brewster window protecting portion of the laser of FIG. 1.

As shown in FIG. 9, a plurality of openings 21, 21 . . . are formed in the connecting flanges 20 and 20, and an annular cutout 22 is formed in the inner periphery of the outer end surface of each connecting flange 20.

OTHER ITEMS

Shown at numerals 23 and 23 are heater wires being wound around outer peripheral surfaces of the main anode mounts 7, 7 . . . , the metal chambers 17, 17 . . . and the cathode pin mount 15, and are connected to a control circuit not shown in the drawings.

Further, there are provided on the central tube portion 5 a He (helium) gas supply, a getter device and like, which will be described hereinafter.

END TUBE PORTIONS

Since the construction of the front and rear end tube portions 6 and 6' are similar, the description will be made with respect to the front end tube portion 6 and, with respect to the rear end tube portion 6' the same reference numerals with the prime (') are applied to parts corresponding to the portion 6 and the detailed description therefor is omitted.

The portion 6 is made of glass into an elongated tube with one end being fused to the connecting flange 25 and the other end or the free end being inclined relative to the longitudinal axis by an angle of Brewster and closed by a Brewster window 24 fused thereto.

The connecting flange 25 comprises a tubular portion 26, a connecting portion 27 being connected to one end of the tubular portion 26 and the diameter of which being smaller than that of the tubular portion 26, and a flange portion 28 projecting radially outward from the other end of the tubular portion 26. The tubular portion 26 and the flange portion 28 are made of a non-magnetic material such as stainless steel, and the connecting portion 27 is made of a metal such as covar with the coefficient of thermal expansion of which being near to that of the glass of the end tube portion 6. The tubular portion 26 and the connecting portion 27 are connected together by such as fusion welding.

A plurality of screw-threaded openings 29, 29 . . . are formed in the peripheral portion of the flange portion 28 corresponding respectively to the openings 21, 21 . . . . in the connecting flanges 20.

The connecting portion 27 of the connecting flange 25 and the other end of the end tube portion 6 are fixedly connected through one or more intermediate glass layers (not shown) to adjust the difference in the coefficient of thermal expansion.

The flange portion 28 of the connecting flange 25 of the end tube portion 6 and the connecting flange 20 of the central tube portion 5 are connected together by screws 30, 30 . . . inserted through the openings 21, 21 . . . and engaging screw-threadingly into the openings 29, 29 . . . thereby the end tube portion 6 is connected to one end of the central tube portion 5. Similarly, the end tube portion 6' is connected to the other end of the central tube portion 5 to constitute the main tube 4.

HOLLOW CATHODE

The hollow cathode 31 is made of an electroconductive material into a generally tubular form and has a central bore being defined as a cathode bore 32.

The hollow cathode 31 has the outer diameter slightly smaller than the inner diameter of the glass main tube 5 and is inserted into the main tube 5 slidably.

The hollow cathode 31 has, at the condition located in the main tube 5, openings 33, 33 . . . corresponding to the main anodes 11, 11 . . . and metal chambers 17, 17 . . . respectively.

Figure 4:
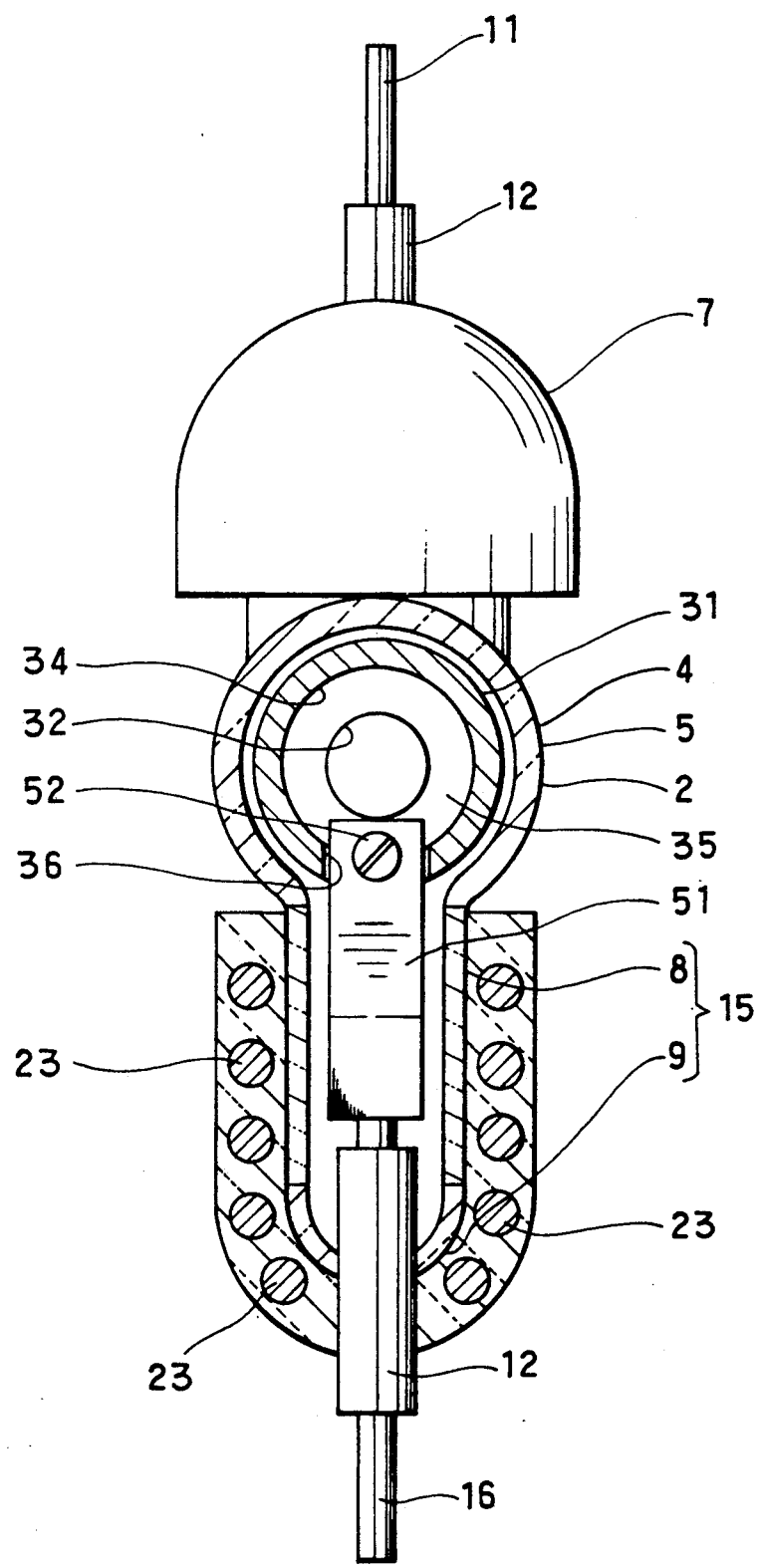
FIG. 4 is an enlarged sectional view taken generally along line IV—IV of FIG. 3.
Figure 8:
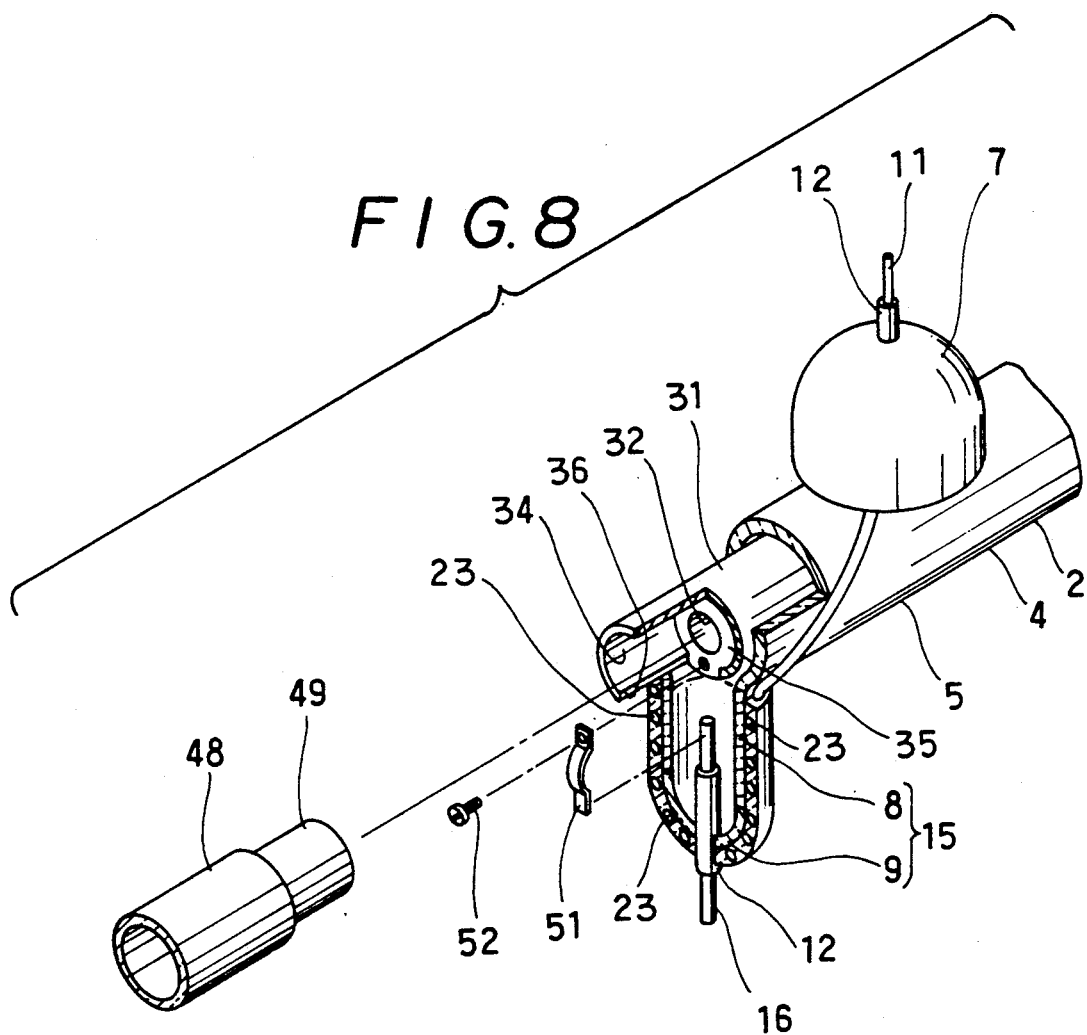
FIG. 8 is an enlarged exploded perspective view of a hollow cathode retaining portion of the laser of FIG. 1.

The hollow cathode 31 has, on the front and rear ends, increased inner diameter portions 34 and 34 which define stepped portions 35 and 35 at the inner ends or between the remaining portion of the bore 32. In one increased inner diameter portion 34, there is formed a cutout 36 as shown in FIGS. 4 and 8 along the entire length. When the hollow cathode 31 is located in the main tube portion 5, the inner end of the cutout 36 aligns generally with the center line of the cathode pin mount 15 as shown in FIG. 1.

BREWSTER WINDOW PROTECTING PORTION

Shown at numerals 37 and 37' are brewster window protecting portions provided respectively in the tubular portions 26 and 26' of the connecting flanges 25 and 25'. Since the brewster window protecting portions 37 and 37' have substantially the same or symmetrical construction, the description will be made with respect to the portion 37 and the same reference numerals with the prime are applied to the portion 37' and the detailed description therefor is omitted.

Shown at 38 is a first partition plate of a circular disc shape, the diameter of which being nearly equal to the inner diameter of the tubular portion 26. The partition plate 38 has an annular ridge 39 on the outer periphery, and an outwardly tapered opening 40 in the central portion.

The first partition plate 38 is fitted in the tubular portion 26 with the small diameter portion of the opening 40 being located toward the Brewster window 24.

A generally cylindrical spacer 41 having a cutout 41a along the entire length in the lower side is also fitted in the tubular portion 26.

Shown at numeral 42 is a second partition plate of a circular disc shape the diameter of which being nearly equal to the inner diameter of the tubular portion 26. The second partition plate 42 has an annular ridge 43 on the outer periphery, and an inwardly tapered opening 44 in the central portion. The second partition plate 42 is fitted in the tubular portion 26 with the large diameter portion of the opening 44 being located facing the first partition plate 38.

Thus, a space 45 is defined in the tubular portion 26 and between the first and second partition plates 38 and 42 and in the spacer 41. The cutout 41a is located on the lower side of the space 45.

The first and second partition plates 38 and 42 and the spacer 41 are made of a non-magnetic metal.

A spherical plug ball 46 made of an magnetic metal with the diameter of which being larger than that of the openings 40 and 44 is disposed in the space 45.

Normally, the plug ball 46 is located in the cutout 41a and does not interfere the zone connecting the openings 40 and 44.

Shown at 47 is a metal gasket made of a relatively plastic material such as oxygen free copper into an annular shape. The gasket 47 is located between the cutout 22 in the connecting flange 20 and the second partition plate 42 and, at this condition, the connecting flanges 20 and 25 are connected together by connecting screws 30, 30 . . . thereby, the metal gasket deforms plastically to reliably seal the central tube portion 5 and the end tube portion 6.

RETAINING THE HOLLOW CATHODE

Shown at numerals 48 and 48' are spacer tubes made of a glass with the outer diameter of which being slightly smaller than the inner diameter of the central tube portion 5. The spacer tubes 48 and 48' have on one ends reduced diameter portions 49 and 49', and are inserted into the front and rear ends of the central tube portion 5, with the reduced diameter portions 49 and 49' being fitted respectively in the increased inner diameter portions 34 and 34 and the end surfaces abutting with the stepped portions 35 of the hollow cathode 31 respectively.

Shown at numerals 50 and 50' are coil springs with one ends resiliently abutting with one ends or the outer ends of the spacer tubes 48 and 48' interposing getters 71 and 71' (described hereinafter) therebetween. The other ends of the coil springs 50 and 50' resiliently abut with the metal gaskets 47 and 47' respectively.

Thus, the hollow cathode 31 is retained and located in the glass main tube 4 with the opposite ends being resiliently supported by the coil springs 50 and 50'.

Shown at 51 is a flexible connecting piece made of a thin electroconductive metal plate such as nickel with one end being connected to the cathode pin 16 and the other end being connected to rear end surface of the cutout 36 in one end of the hollow cathode 31 through an electroconductive pin 52.

HELIUM GAS SUPPLY DEVICE

Figure 7:
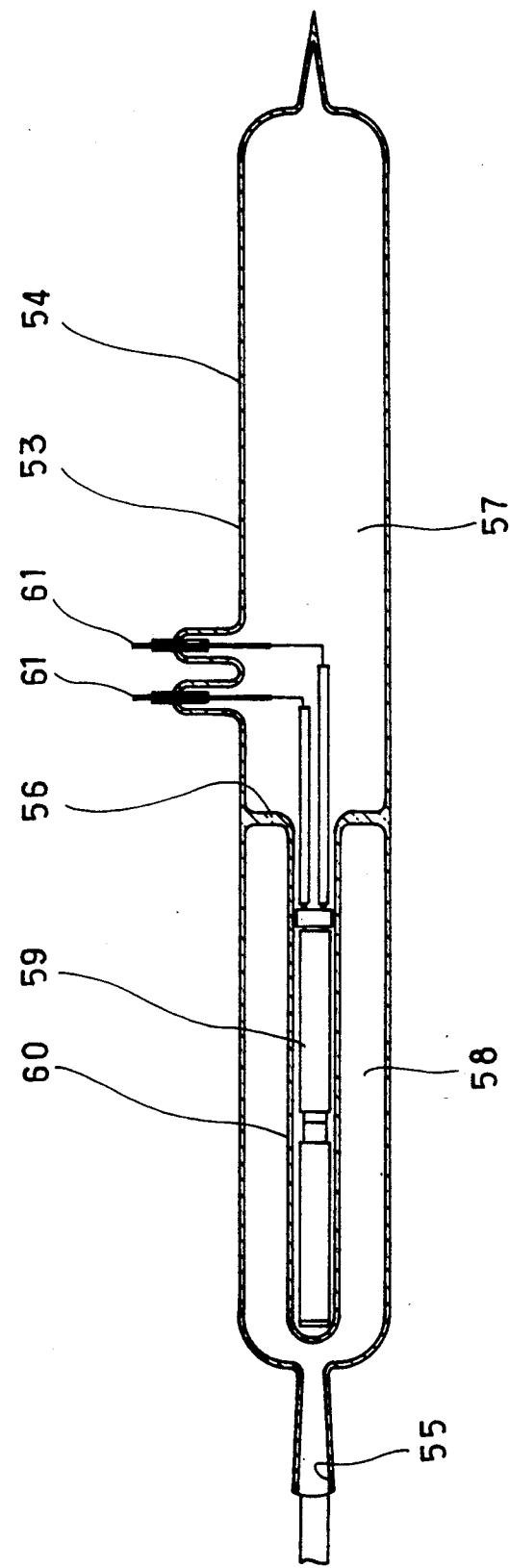
FIG. 7 is an enlarged sectional view taken generally along line VII—VII of FIG. 2.

Shown at 53 in FIG. 2 is a device for supplying helium (He) gas which acts as a buffer gas in He-Cd laser. The device 53 comprises an outer tube 54 being formed of a material non-permeable against He gas such as borosilicate glass and the outer tube 54 is closed except for an opening 55 as shown in FIG. 7.

A partition wall 56 is provided in the outer tube 54 to divide the interior of the outer tube 54 into a gas reservoir 57 and a supply portion 58 communicating with the opening 55.

A ceramic heater 59 is inserted into a tubular heater retaining portion 60 which is formed by deforming a part of the partition wall 56 into a tubular form. The heater 59 is connected through lead wires 61 and 61 to a source of electric power not shown in the drawing. The heater retaining portion 60 is formed of a material the gas permeability of which increases in the high temperature condition such as silica glass. In the gas reservoir 57 there is enclosed helium gas of several hundreds Torr.

Figure 5:
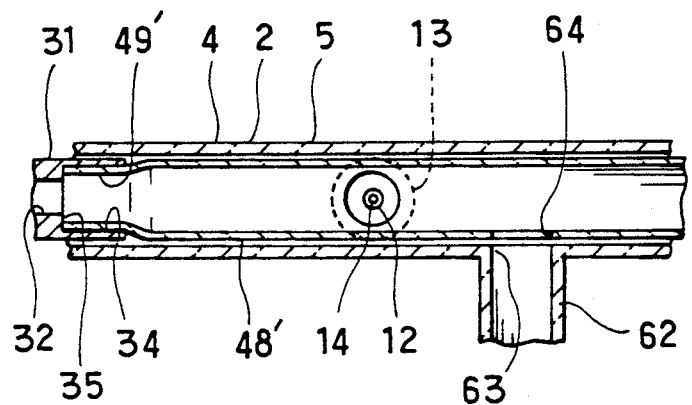
FIG. 5 is an enlarged sectional view taken generally along line V—V of FIG. 1.

Shown at 62 is a connecting pipe made of glass with one end of which is connected to an opening 63 (FIG. 5) in the central tube portion 5 of the glass main tube 4 at the location near to the rear end. An opening 64 is formed in the spacer tube 48', as shown in FIG. 5, at the position corresponding to the opening 63. On the other end of the connecting pipe 62 connecting portions 62a and 62b are formed to project therefrom.

Shown at numeral 65 is a connecting pipe made of a metal and has opposite end portions 65a and 65b and an intermediate bellows portion. The end portion 65a of the connecting pipe is connected to the opening 55 of the helium gas supply device 53 and the other end portion 65b is connected to the connecting portion 62a of the connecting pipe 62, thereby the supply portion 58 of the helium gas supply device 53 is connected to the interior of the glass main tube 4.

Shown at numeral 66 is a pressure sensor such as a semi-conductor pressure sensor utilizing a piezo-resistance element, and has a gas receiving portion 66a being connected sealingly to the connecting portion 62b of the connecting pipe 62.

In the hollow cathode type metal ion laser, the active metal (Cd) chamber and the cathode portion are heated to several hundreds degree centigrade. In the metal ion laser utilizing He (helium) gas as a buffer gas, the He gas will be diffused into the atmosphere penetrating through the glass main tube 4, since the size of He atom is small and penetrates through the glass. In particular the He atom easily passes through the silica glass, and when the temperature is elevated the amount of He gas penetration increases correspondingly.

The glass main tube 4, particularly the central tube portion 5 is heated nearly equal to the hollow cathode 31, the amount of He gas penetration is large such that when the operating time of the laser 1 increases the amount of He gas enclosed in the laser tube 2 reduces correspondingly. Further, a part of the He gas will be absorbed by the material of cathode and the like, and accompanying with the vaporized Cd (cadmium) condensing at cooled portion of the laser tube 2, whereby the gas pressure of the He gas in the laser tube 2 decreases, the output power of laser oscillation decreases and, at last, the laser oscillation stops.

For compensating the decrease of He gas, the pressure sensor 66 detects the He gas pressure in the laser tube 2, and when the He gas pressure is decreased below a predetermined level (usually, the pressure of He gas in the laser tube 2 is between several Torrs and several tens Torrs), electric power is supplied to the ceramic heater 59 through a He gas pressure control device not shown in the drawings. Since the permeability of He gas through silica glass increases substantially when the temperature increases, when the heater retaining portion 60 formed of silica glass is heated by the heater 59 the He gas in the gas reservoir 57 passes through the heater retaining portion 60 and flows toward the gas supply portion 58, and through the opening 55, the connecting pipe 65, the connecting pipe 62, and the openings 63 and 64, into the laser tube 2.

GETTER

Figure 6:
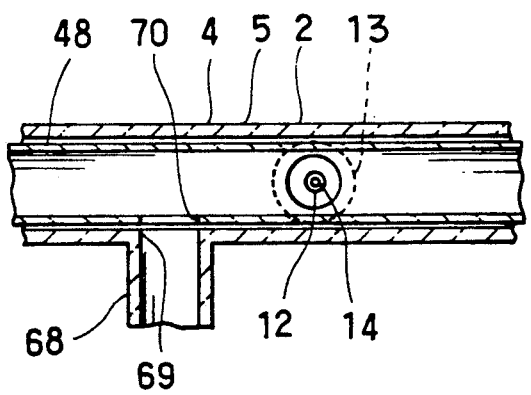
FIG. 6 shows a sectional view taken generally along line VI—VI of FIG. 3.

Shown at numeral 57 is a getter device, and which is connected to the glass main tube 4 through a connecting pipe 68. Openings 69 and 70 are respectively formed in the central pipe portion 5 and the spacer tube 48, as shown in FIG. 6, at positions corresponding to the connecting pipe 68.

Shown at 71 and 71' are getters of annular form being clamped between the coil springs 50 and 50' and the spacer tubes 48 and 48' respectively.

OPERATION

When a predetermined electric voltage is applied between the main anodes 11, 11 . . . and the auxiliary anodes 14 and 14 and the hollow cathode 31, negative glow discharge generates between the main anodes 11, 11 . . . and the hollow cathode 31. The heat loss of the negative glow discharge and the heating of the heater wires 23, 23 . . . act to generate Cd vapor. The Cd vapor is excited to higher energy levels by excitation particles such as He ions, and the laser oscillation is commenced.

The Cd vapor flowing from opposite end portions of the cathode bore 32 and toward the Brewster windows 24 and 24' are blown back respectively by the auxiliary anode 14 and 14 and toward the cathode bore 32.

As described above, when the pressure of He gas in the laser tube 2 is decreased, the He gas is supplied into the laser tube 2 by the helium gas supply device 53.

The Brewster window protecting portions 37 and 37' act to protect the Brewster windows 24 and 24' respectively from stain during the manufacturing process.

In particular, the glass main tube 4 should contain a predetermined atmosphere therein, thus, it is required to firstly exhaust the interior of the glass main tube 4 through such as the end portion of the connecting pipe 62 and/or the end portion of the connecting pipe 68, then, the gas in the glass main tube 4 flows toward the Brewster window 24 and/or the Brewster window 24' which accompanies minute particles of Cd, dirt or dust toward the Brewster window 24 and/or 24'. According to inertia force, some particles fail to turn toward the connecting pipe 62 and/or 68 and strike against and stain the Brewster window 24 and/or 24'.

Figure 10:
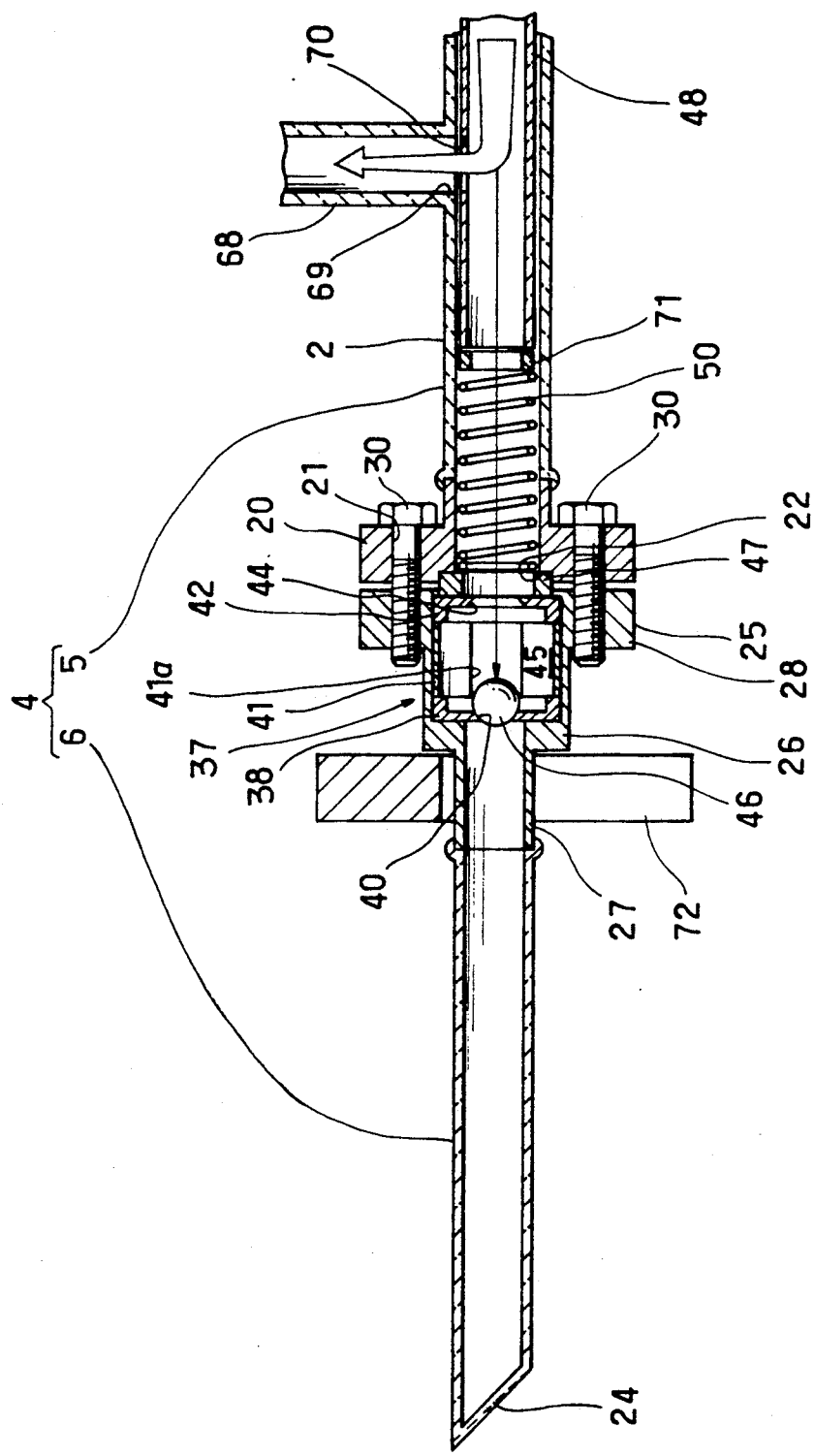
FIG. 10 is a sectional view illustrating the operation of the Brewster window protecting portion at one end portion of the laser of FIG. 1.

For preventing such shortcomings, magnets 72 and 72 are respectively approached toward the first partition plates 38 and 38' from the side of the Brewster windows 24 and 24', during the exhausing, gas cleaning and gas substituting process. The plug balls 46 and 46' being formed of magnetic material are attracted by the magnets 72 and 72 and, as shown in FIG. 10, the openings 40 and 40' in the partition plates 38 and 38' are closed. Thus, the particles of Cd and the like are prevented from striking against the Brewster windows 24 and 24' by the first partition plates 38 and 38', thus, the Brewster windows 24 and 24' are maintained clean.

After the above described process, the magnets 72 and 72 are removed, then, the plug balls 46 and 46' return to the cutouts 41a and 41'a. Thus, the laser oscillation is not obstructed.

ADVANTAGES OF THE INVENTION

In the hollow cathode type metal ion laser 1, since the hollow cathode 31 is not fixedly mounted in the glass main tube 4, the glass main tube 4 does not receive any excessive stress due to the difference in the amount of thermal expansion, and the breakage of the glass main tube 4 can be prevented reliably.

Since the opposite ends of the hollow cathode 31 are supported resiliently the elongation due to the thermal expansion can be absorbed equally, the displacement in the longitudinal position between the main anodes 11, 11 . . . and metal chambers 17, 17 . . . and the like provided on the glass main tube 4 and the openings 33, 33 . . . in the hollow cathode 31 do not impede the normal operation of the laser.

Further, the hollow cathode 31 and the cathode pin 16 are connected through the flexible connecting piece 51, thus, the movement of the hollow cathode 31 relative to the glass main tube 4 is not impeded.

Further, even if a large longitudinal force is applied on the hollow cathode 31 so as to move it relative to the glass main tube 4 during transportation, storage and the like, the movement of the hollow cathode 31 will be absorbed by the springs 50 and 50' and excessive stress will not be applied on the glas main tube 4.

MODIFIED EMBODIMENT

Figure 11:
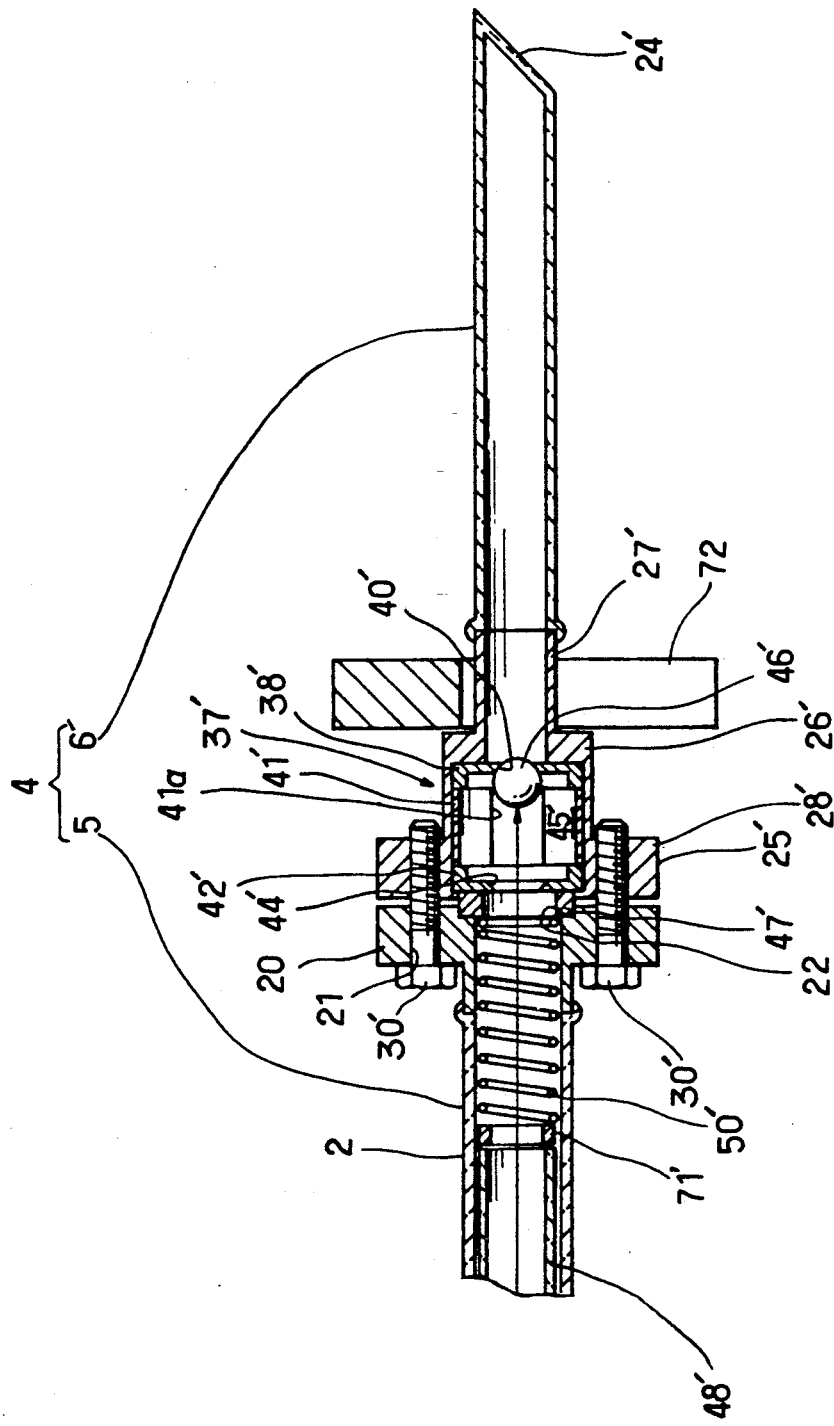
FIG. 11 is a sectional view similar to FIG. 10 but showing the other end portion of the laser.
Figure 12:
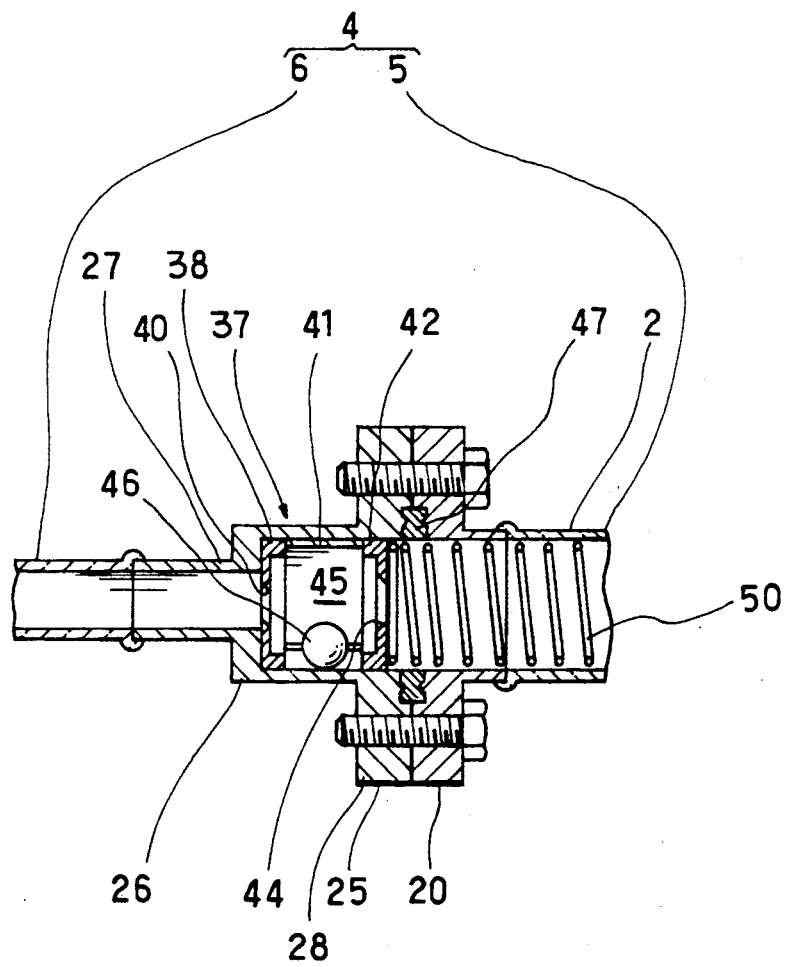
FIG. 12 is a sectional view of an essential portion of a modified embodiment.

FIG. 11 shows a modified embodiment, in which the outer end of the coil spring 50 passes through the connecting flanges 20 and 25 and abuts directly with the peripheral portion of the second partition plate 42.

Further, the metal gasket 47 is interposed between the flange portion 28 of the connecting flange 25 and adjacent surface of the connecting flange 20.

In the embodiments, the present invention is applied on He-Cd ion laser, but can be applied on other hollow cathode type metal vapor lasers.

It will be understood that the embodical construction and configuration shown and described relative to the embodiments do not limit the technical scope of the present invention which is limited by claims, for example, the position and the number of the anodes and the metal chambers are not limited to the embodiments, and the spring means and supporting means therefor can be determined as desired.

We claim:

1. A hollow cathode type metal ion laser utilizing negative glow discharge for generating a laser beam, comprising:
   a glass tube extending fore and aft directions;
   a hollow elongated cathode inserted into said glass tube;
   a plurality of anodes mounted on said glass tube;
   a pair of Brewster windows sealingly fixed to axial opposite ends of said glass tube;
   coil springs disposed between opposite ends of said hollow cathode and corresponding ends of said glass tube respectively and resiliently retained said hollow cathode in said glass tube;
   Brewster window protecting devices provided in said glass tube and near to said Brewster windows.

2. A hollow cathode type metal ion laser according to claim 1, wherein the Brewster window protecting device consists of a magnetically displaceable plug ball, and comprising a partition plate having an opening for cooperating with said plug ball, with said opening acting normally as a passage of laser beam.

3. A hollow cathode type metal ion laser according to claim 1, wherein a cathode pin is passing through and retained on a side wall of the glass tube, and the hollow cathode is connected to the cathode pin through a connector piece which is formed of a flexible electroconductive material.

4. A hollow cathode type metal ion laser according to claim 1, wherein the hollow cathode is retained and slidably supported in the glass tube.

* * * * *